United States Patent
Sanders et al.

(10) Patent No.: US 8,997,512 B2
(45) Date of Patent: Apr. 7, 2015

(54) FLUID LEVEL MEASUREMENT SYSTEM AND METHOD

(75) Inventors: Russell L. Sanders, Minnetonka, MN (US); Anthony J. McReynolds, Lonsdale, MN (US); Randy Hochstein, Plymouth, MN (US); Ashok Muralidhar, Eagan, MN (US)

(73) Assignee: Thermo King Corporation, Minneapolis, MN (US)

( * ) Notice: Subject to any disclaimer, the term of this patent is extended or adjusted under 35 U.S.C. 154(b) by 1041 days.

(21) Appl. No.: 13/078,620

(22) Filed: Apr. 1, 2011

(65) Prior Publication Data

US 2011/0239664 A1    Oct. 6, 2011

Related U.S. Application Data

(60) Provisional application No. 61/320,033, filed on Apr. 1, 2010.

(51) Int. Cl.
*B60H 1/32* (2006.01)
*G01F 23/296* (2006.01)

(52) U.S. Cl.
CPC ........ *G01F 23/2962* (2013.01); *G01F 23/2968* (2013.01)

(58) Field of Classification Search
USPC .................. 73/1.73, 290 V; 62/239
See application file for complete search history.

(56) References Cited

U.S. PATENT DOCUMENTS

| | | | |
|---|---|---|---|
| 4,984,449 A | | 1/1991 | Caldwell et al. |
| 5,319,973 A | | 6/1994 | Crayton et al. |
| 5,557,938 A | * | 9/1996 | Hanson et al. ................. 62/126 |
| 5,609,059 A | | 3/1997 | McEwan |
| 6,360,599 B1 | | 3/2002 | Pathak et al. |
| 6,484,088 B1 | | 11/2002 | Reimer |
| 6,573,732 B1 | * | 6/2003 | Reimer .......................... 324/644 |
| 6,951,131 B2 | | 10/2005 | Sawert et al. |
| 7,086,285 B2 | | 8/2006 | Reed |
| 7,389,693 B2 | | 6/2008 | Reed et al. |
| 7,395,711 B2 | | 7/2008 | Greenwood |
| 7,421,895 B1 | | 9/2008 | Caldwell |
| 7,542,870 B2 | | 6/2009 | Reimer et al. |
| 2005/0005696 A1 | * | 1/2005 | Hale et al. ................... 73/290 V |
| 2007/0169549 A1 | | 7/2007 | Kwun et al. |
| 2009/0178478 A1 | | 7/2009 | Reimelt et al. |
| 2010/0001867 A1 | | 1/2010 | Rodrigue et al. |
| 2010/0018309 A1 | * | 1/2010 | Marcovecchio et al. ... 73/290 V |

OTHER PUBLICATIONS

Thermo King Corporation, "Fuel Tank Ass'y Gas & Diesel STL." dated Mar. 18, 2008 (2 pages).

(Continued)

*Primary Examiner* — Cassey D Bauer
(74) *Attorney, Agent, or Firm* — Hamre, Schumann, Mueller & Larson, P.C.

(57) ABSTRACT

A transport refrigeration system for a transportable temperature controlled space includes a compressor, a condenser and an evaporator fluidly connected to one another, an engine operatively connected to the compressor, and a fuel tank assembly fluidly connected to the engine. The fuel tank assembly includes a fuel tank configured to contain the fuel, a fuel vapor and air, and an ultrasonic fluid level sensor for sensing a level of fuel, the fuel tank having a maximum fuel level. The fluid level sensor includes a transducer having a ring period. The distance from the fluid level sensor to the maximum fuel level is at least half the distance that the sound travels through the fuel vapor and air during the ring period of the transducer.

15 Claims, 6 Drawing Sheets

(56) References Cited

OTHER PUBLICATIONS

Thermo King Corporation, "Fuel Tank Ass'y.—Gasoline & Diesel 22" O. Dia. Aluminum" Dec. 2, 2008 (2 pages).

Ingersoll Rand Thermo King, "Tank" dated Jul. 13, 2004 (2 pages).

Ingersoll Rand Thermo King, "Diagram Outline Tank Fuel 120 Gallons" dated Mar. 18, 2008 (1 page).

\* cited by examiner

FLUID LEVEL MEASUREMENT SYSTEM AND METHOD

RELATED APPLICATIONS

This application claims priority to U.S. Provisional Patent Application No. 61/320,033 filed on Apr. 1, 2010, the entire content of which is incorporated herein by reference.

BACKGROUND

The present invention relates to an apparatus and method for making ultrasonic fluid level measurements in a transport refrigeration application. Particularly, the invention relates to the position of a fluid level sensor for detecting a fuel level in a fuel tank associated with a transport temperature control system.

In a transport temperature control system application, a temperature controlled space is transported over a road, rail, sea, air or the like. As a result, fuel in a fuel tank for the temperature control system is subjected to vibrations from turbulence resulting from movement of the temperature controlled space. Furthermore, periodic stopping and starting of the temperature control system while the temperature controlled space is in transit causes periodic electrical noise associated with cranking of an engine that drives a compressor. Thus, the fluid level sensor is simultaneously subjected to vibration noise and electrical noise, which causes errors in the fluid level reading.

SUMMARY

In one construction, the invention provides a transport refrigeration system for a transportable temperature controlled space. The transport refrigeration system includes a compressor, a condenser and an evaporator fluidly connected to one another, an engine operatively connected to the compressor, and a fuel tank assembly fluidly connected to the engine. The fuel tank assembly is subjected to vibrations from movement of the temperature controlled space as the temperature controlled space is transported. The fuel tank assembly includes a fuel tank configured to contain a fuel, a fuel vapor and air, the fuel tank having a maximum fuel level. The fuel tank assembly also includes an ultrasonic fluid level sensor for sensing a level of fuel, the fluid level sensor coupled to the fuel tank and positioned a distance from the maximum fuel level. The fuel tank assembly also includes a power source electrically connected to the fluid level sensor for powering the fluid level sensor. The fluid level sensor includes a transducer having a ring period, and the distance from the fluid level sensor to the maximum fuel level is at least half the distance that the sound travels through the fuel vapor and air during the ring period of the transducer.

In another construction, the invention provides a transport refrigeration system for a transportable temperature controlled space. The transport refrigeration system includes a compressor, a condenser and an evaporator fluidly connected to one another, an engine operatively connected to the compressor, and a fuel tank assembly fluidly connected to the engine. The fuel tank assembly is subjected to vibrations from movement of the temperature controlled space as the temperature controlled space is transported. The fuel tank assembly includes a fuel tank configured to contain a fuel, a fuel vapor and air, the fuel tank having a maximum fuel level and an interior and an exterior. The fuel tank assembly also includes an ultrasonic fluid level sensor for sensing a level of fuel, the fluid level sensor coupled to the fuel tank and spaced from the maximum fuel level, and a tubular spacer having a first end and a second end and a length between the first end and the second end. The first end is positioned adjacent the ultrasonic fluid level sensor and the second end is positioned in communication with the interior of the tank. The fluid level sensor includes a transducer having a ring period, and the length of the spacer is at least half the distance that the sound travels through the fuel vapor during the ring period of the transducer.

In yet another construction, the invention provides a method for positioning an ultrasonic fluid level sensor in a tank assembly including a tank containing a fluid, a fluid vapor and air, wherein the fluid level sensor includes a transducer having a ring period. The method includes calculating a near field distance of the fluid level sensor based on the speed of sound through the fluid vapor and the ring period of the transducer, determining a maximum fluid level in the tank, and positioning the fluid level sensor at a distance from the maximum fluid level greater than or equal to half the near field distance.

Other aspects of the invention will become apparent by consideration of the detailed description and accompanying drawings.

DETAILED DESCRIPTION

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways.

Figure 1:
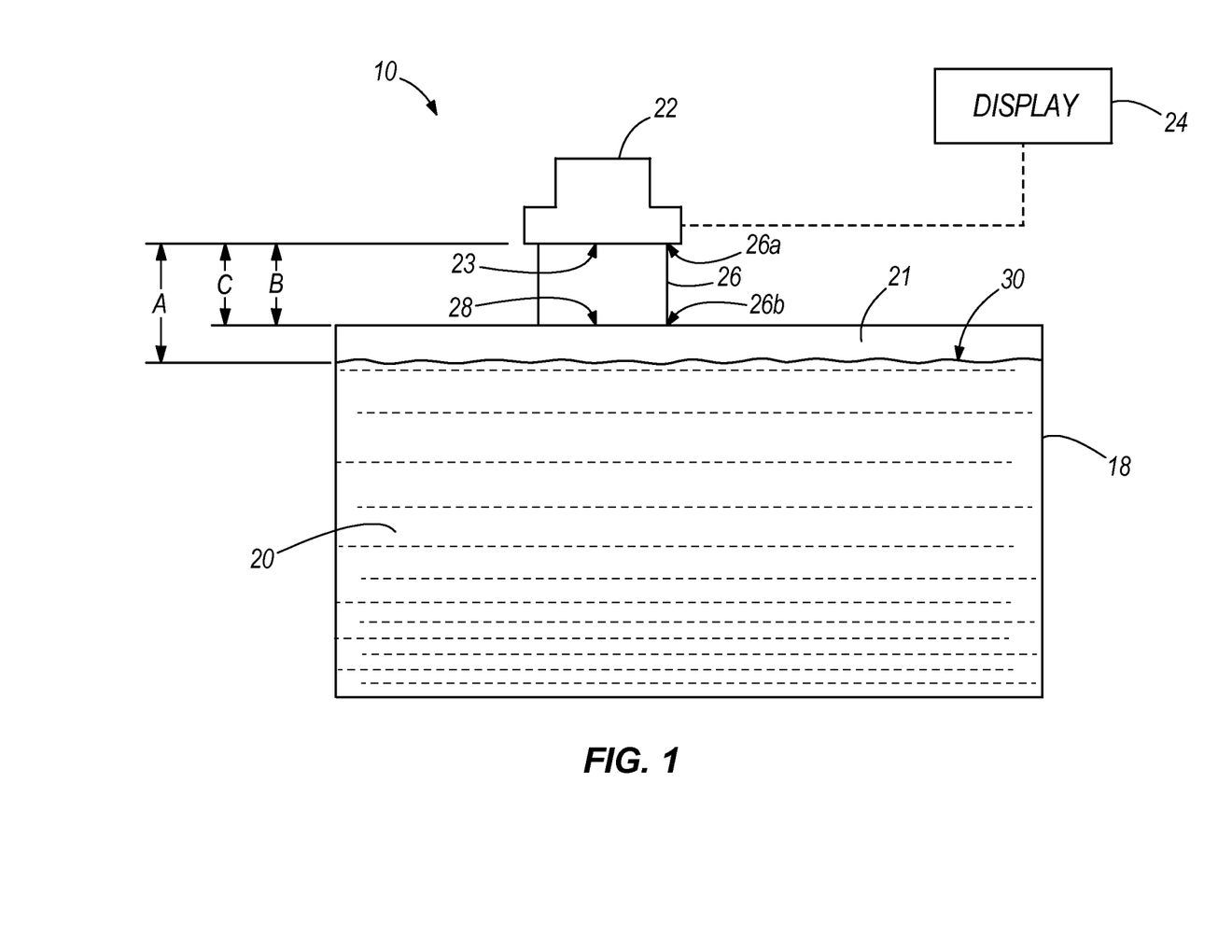
FIG. 1 is a schematic illustration of a fluid level measurement system for a tank in accordance with the present invention.

FIG. 1 illustrates a fluid level measurement system 10 for use with a transport temperature control system 14 (FIGS. 3-6). The fluid level measurement system 10 includes a fluid tank 18 for containing a fluid 20 and a fluid vapor 21, such as a fuel tank containing a fuel and fuel vapor, and a fluid level sensor 22 having a face 23. In the illustrated construction, the tank 18 is a cylindrical diesel fuel tank coupled horizontally to a vehicle (FIG. 5) such that a longitudinal axis thereof lies substantially parallel to the ground. A spacer 26 is coupled with the tank 18 adjacent an opening in the tank 18 and extends from the top of the tank 18. The spacer 26 is a tubular structure having a wall extending axially from an outer surface of the tank 18 and having first and second open free ends 26a, 26b, respectively. The sensor 22 is coupled with the spacer 26 and positioned coaxially with respect to the spacer 26. The face 23 of the sensor 22 is positioned adjacent the first free end 26a and the second free end 26b abuts the tank 18 and is in communication with an interior of the tank 18.

In the illustrated construction, the fluid level sensor 22 is an ultrasonic fluid level sensor including a transducer that emits a sound, by way of an initial vibration, in the direction of a surface 30 of the fluid 20, preferably in a direction perpendicular to the surface 30 of the fluid 20. The sound is emitted from the sensor 22 at the face 23 of the sensor 22. The sensor 22 includes a receiver that senses an echo of the initial sound reflected off the surface 30 and records a time between emitting the sound and receiving the echo. Based on the speed of sound through the medium through which the sound travels, e.g., air and fuel vapor 21, and the recorded time, a separation distance A between the sensor 22 and the surface 30 of the fluid 20 is calculated. The system 10 includes a fluid level algorithm that is calibrated such that the distance A is associated with a fluid level of the tank. The fluid level is displayed on a display 24.

The spacer 26 is sandwiched between the tank 18 and the sensor 22 to provide a minimum separation distance B between the sensor 22 and the surface 30 of the fluid 20 at a maximum fluid level 28. The maximum fluid level 28 is a predetermined level that the tank 18 is designed to hold and need not be the absolute physical maximum of the tank 18. For example, a fuel-dispensing nozzle typically shuts off automatically when the fuel reaches a fluid level that is less than the physical maximum of the tank 18. In this case, the maximum fluid level 28 is the level at which the fuel-dispensing nozzle shuts off, and the fluid level algorithm is calibrated to associate a reading of "FULL" with the maximum fluid level 28. The tank 18 includes a fill neck (not shown) for receiving the fuel-dispensing nozzle. The position of the fill neck (e.g., height) on the cylindrical tank 18 can also define the maximum fluid level 28. The minimum separation distance B occurs when the fuel tank 18 is full and is the minimum distance necessary to inhibit nondeterministic signals, which lead to erroneous fluid level readings by the sensor 22, as will be described in greater detail below. While the minimum separation distance B is constant and unique to a particular configuration of the fluid level measurement system 10, the separation distance A is variable depending upon the level of the fluid 20.

The minimum separation distance B is equal to, or in some constructions may be greater than, half the near field distance. The near field distance is calculated using the equation $D_{nf}=V_{sd}*T_t$, where $D_{nf}$ is the near field distance, $V_{sd}$ is the speed of sound through the medium through which the sound travels, e.g., the fluid vapor 21 and air, and $T_t$ is the ring period of the transducer. As described above, the transducer emits the sound by way of an initial vibration; however, the transducer continues to vibrate at a decreasing magnitude after the initial vibration. The ring period is the time for the vibrations of the transducer to settle, or decrease, below a threshold of the sensor's receiver, i.e., to reach a magnitude of vibration that the receiver of the sensor 22 can no longer detect. In other words, the near field distance is equal to the distance that the sound travels through the medium during the ring period.

The fluid level measurement system 10 is configured based on the near field distance such that the sensor 22 is positioned at a distance from the surface 30 of the fluid 20 that is equal to or greater than half the near field distance when the tank is full 22, as indicated by the following equation:

$$B \geq \frac{V_{sd}*T_t}{2}.$$

That is, the minimum separation distance B is equal to or greater than half the near field distance.

Figure 2:
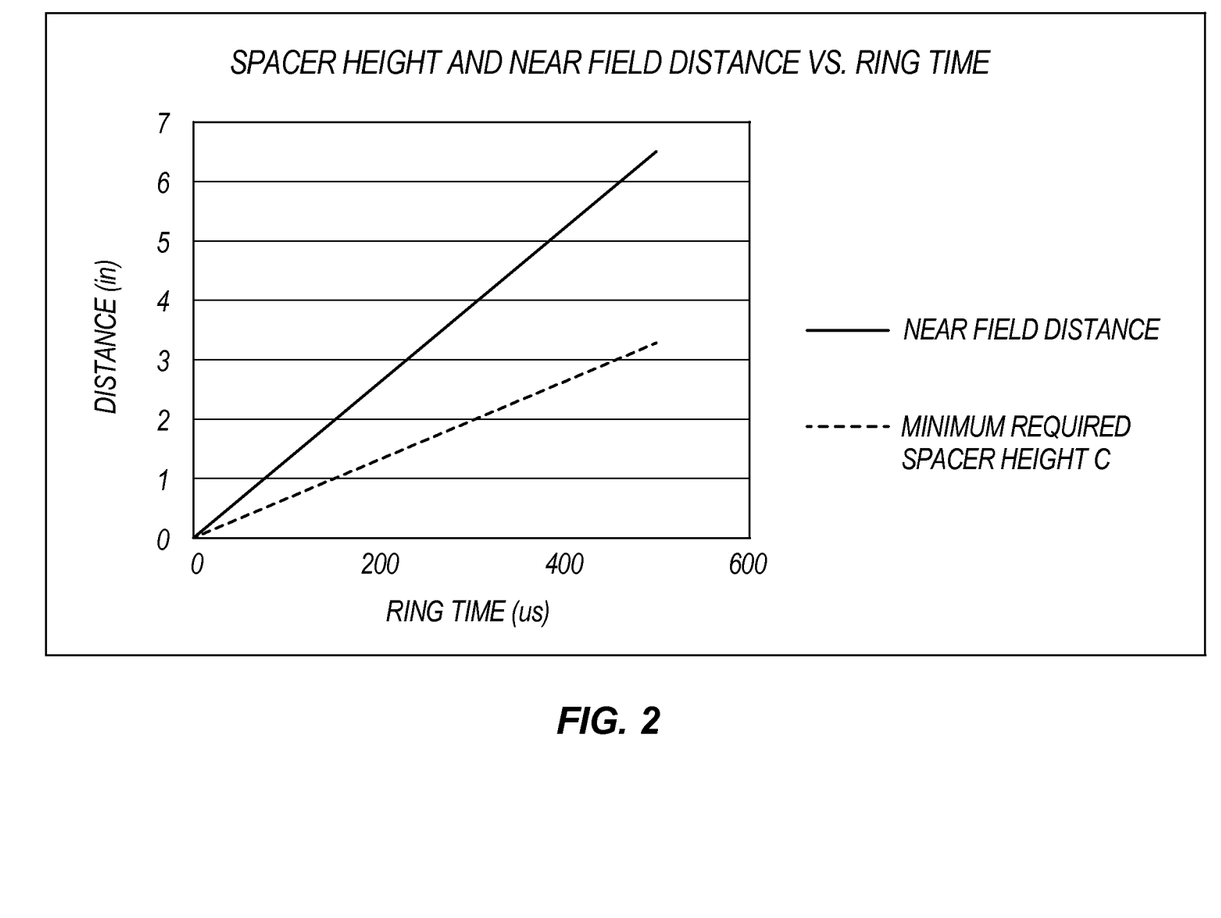
FIG. 2 is a plot of spacer height and near field distance vs. ring time for the fluid level measurement system of FIG. 1.

The spacer 26 is positioned vertically with respect to gravity and is sized to provide a spacer height C such that the sensor 22 and the surface 30 of the fluid 20 are separated by at least half the near field distance when the tank 18 is full. FIG. 2 is a plot of the minimum required spacer height C and near field distance vs. ring time, or ring period. In the illustrated construction, the spacer height C is approximately equal to the minimum separation distance B. The spacer height C depends on the construction of the tank 18. In the illustrated construction, the sensor 22 is employed with a diesel fuel tank 18 in which the spacer 26 extends between the maximum fluid level 28 and the face of the sensor 22, as can be seen in FIG. 1. In other constructions, the sensor 22 may be employed with other types of tanks suited for holding fluid in mobile applications. In some constructions, other relationships between spacer height C and minimum separation distance B are possible depending on the geometry of the tank 18. In other constructions, a spacer is not necessary to provide a sufficient minimum separation distance B between the sensor 22 and the maximum fluid level 28.

In the illustrated construction of FIG. 1, the sensor 22 has a ring period of 500 microseconds which corresponds to a near field distance of approximately 6.5 inches. Therefore, the minimum separation distance B is approximately 3.25 inches. Inherently, the separation distance A is greater than half the near field distance when the tank 18 is not full.

The fluid level measurement system 10 is preferably employed with a transport temperature control system fuel tank 18, such as for a truck, a trailer, a shipping container, a rail container, a van or another transport vehicle that stores and/or carries goods that must be maintained in a temperature controlled environment. However, in other constructions, other types of tanks for other applications may be used.

Figure 3:
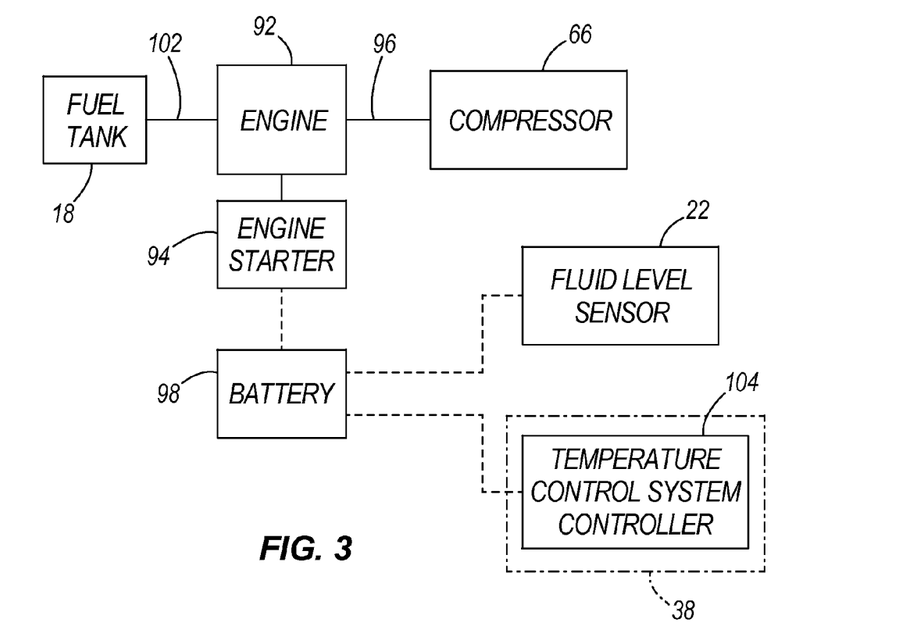
FIG. 3 is a schematic diagram of a container power system for powering the fluid level measurement system.
Figure 5:
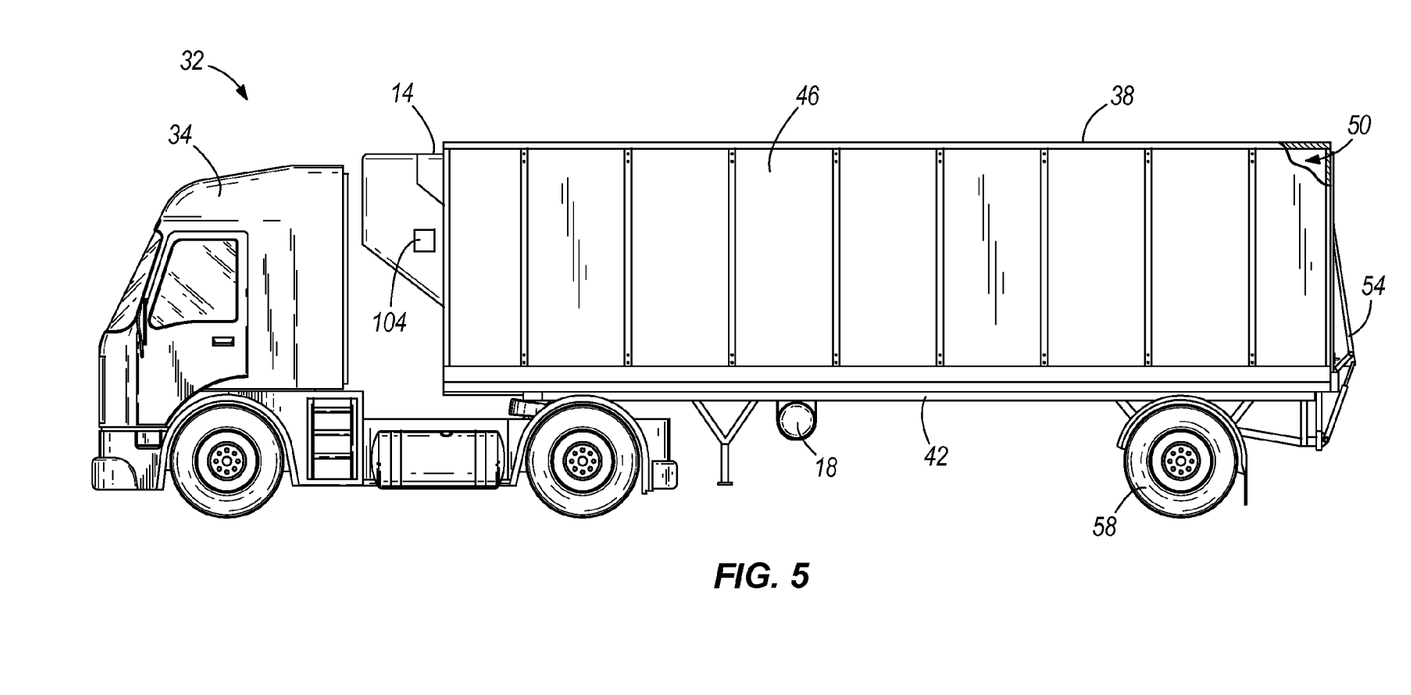
FIG. 5 is an image of a tractor and trailer having the tank of FIG. 1.

In one construction, illustrated in FIGS. 3 and 5, the fuel tank 18 and fluid level measurement system 10 are coupled to a transport vehicle 32 including a tractor 34 and trailer 38. As shown in FIG. 5, the trailer 38 includes a frame 42 and an outer wall 46 supported on the frame 42 for substantially enclosing a temperature controlled load space 50. Doors 54 are supported on the frame 42 for providing access to the load space 50. In some constructions, the load space 50 can include a partition or an internal wall for at least partially dividing the load space 50 into sub-compartments, including two or more load space zones, each of which can be maintained at a different temperature or a different humidity. A plurality of wheels 58 are provided on the frame 42 to permit movement of the vehicle 32 across the ground. In some constructions, wheels and/or rails for a railroad or a boat vessel can be used for transporting temperature controlled containers.

Figure 6:
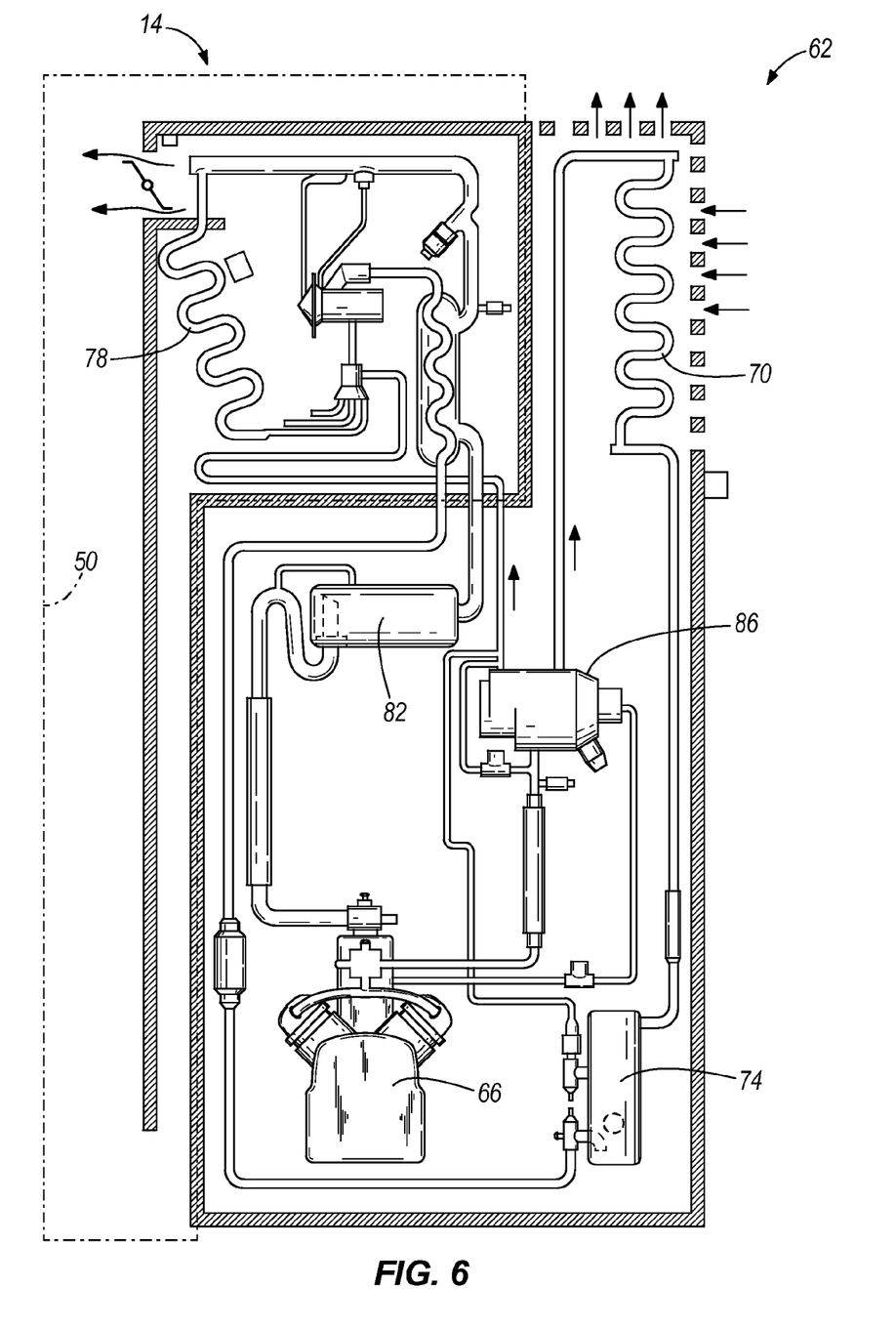
FIG. 6 is a schematic diagram of a temperature control system for the trailer of FIG. 5.

FIG. 6 illustrates one construction of a temperature control system 14 that conditions the load space 50 of the trailer 38. The temperature control system 14 includes a refrigeration circuit 62 having a compressor 66, a condenser 70, a receiver 74, an evaporator 78 and an accumulator 82 connected in series, as is well understood in the art. The refrigeration circuit 62 may also include other components well known in the art, such as a three-way switching valve 86 for switching between a heating mode and a cooling mode. The temperature control system is fully described in U.S. Pat. No. 6,367,269 titled "ELECTRONIC THROTTLING VALVE DIAGNOSIS AND PREVENTATIVE SHUTDOWN CONTROL," assigned to the same assignee as the present invention, the content of which is hereby fully incorporated herein by reference.

The compressor 66 is operatively coupled to an engine 92. As shown schematically in the construction of FIG. 3, the engine 92, such as a diesel engine, is coupled to the compressor 66 by a transmission 96 for driving the compressor 66. The fuel tank 18 supplies fuel to the engine 92 by way of a fuel line 102. FIG. 3 further illustrates a power source, such as a battery 98, for powering the fluid level sensor 22, for powering a controller 104 for the temperature control system, and for powering an engine starter 94 for starting the engine 92 when cooling or heating is needed. Other components of the temperature control system 14 may also be powered by the battery 98.

In other constructions, the engine 92 may include the vehicle engine or a gasoline engine. Other arrangements are possible and may be implemented, as desired. The fuel tank 18 may supply fuel to one or more of the engines employed.

Figure 4:
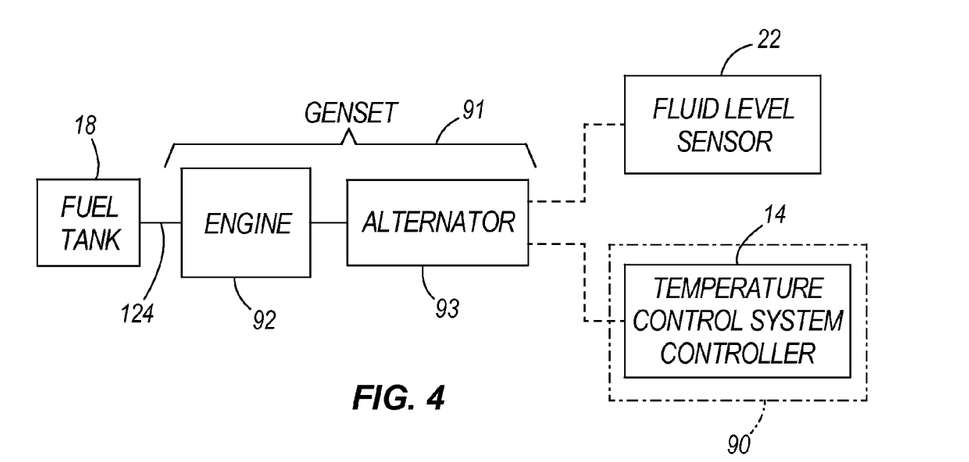
FIG. 4 is a schematic diagram of a trailer power system for powering the fluid level measurement system.

FIG. 4 illustrates another construction in which the fluid level sensor 22 is employed with a temperature controlled transport container 90. For shipments of perishable goods, the temperature control system 14 may be employed to heat and/or cool the container 90. The transport container 90 may be transported by a variety of modes, such as by railcar, barge and truck. While the transport container 90 is stationary, such as while stored in a warehouse, on a dock, or near an airport, an external source of power such as utility electricity may be connected for powering the temperature control system 14. If the container 90 is not provided with an external power source, a generator set 91 may be provided to power the temperature control unit 14. For example, when the container is in transit by railcar, barge, or truck, the generator set 91 may be necessary. The generator set 91 includes the engine 92 to drive an alternator 93 which in turn provides electric power to the temperature control system 14, specifically the compressor 66. Thus, the engine 92 is operatively connected to the compressor 66. The alternator 93 also provides electric power to the fluid level sensor 22.

Figure 7:
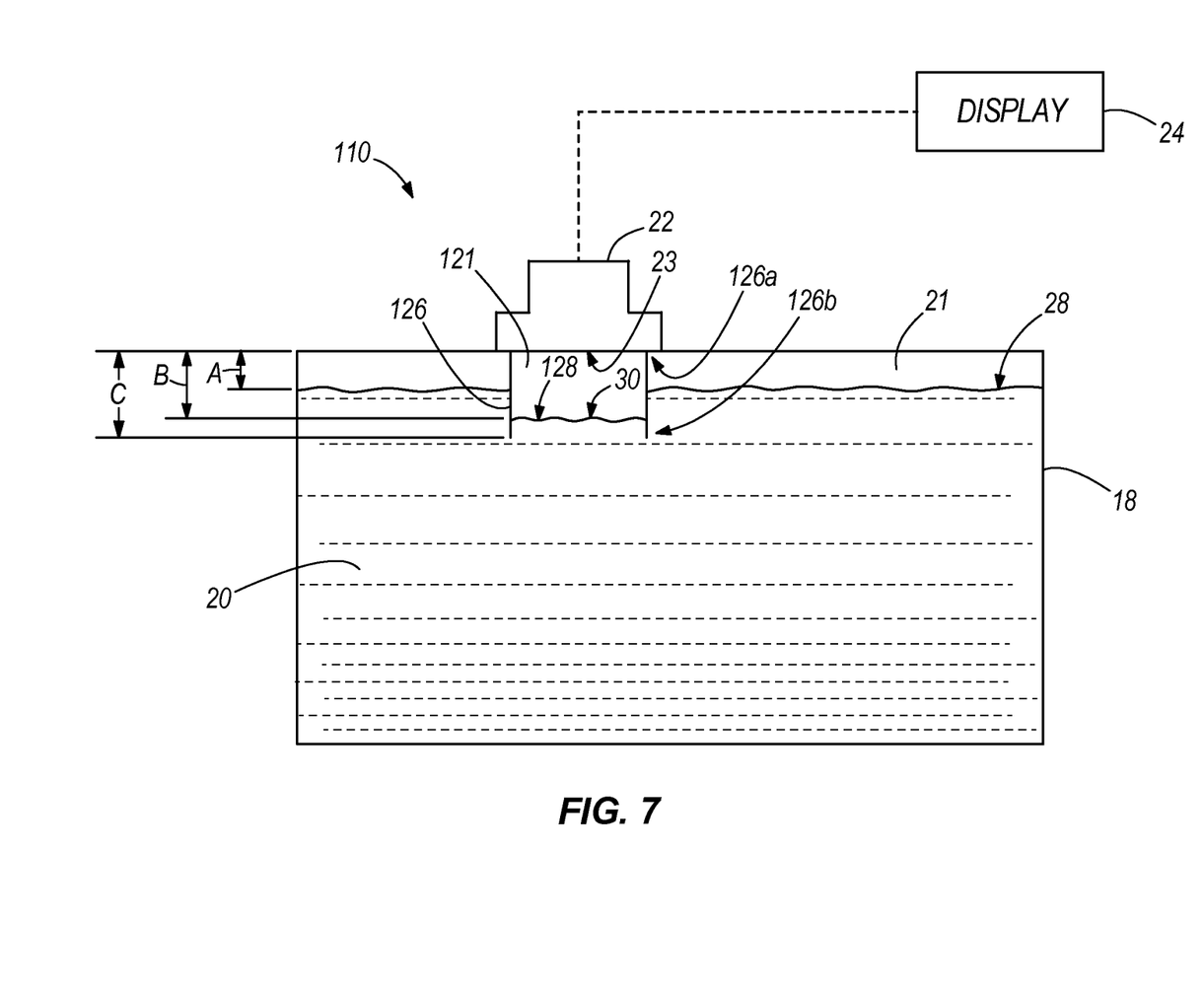
FIG. 7 is a schematic illustration of another construction of a fluid level measurement system for a tank in accordance with the present invention.

FIG. 7 illustrates another construction of a fluid level measurement system 110 having an internal spacer 126. Elements of this construction that are similar to the construction of FIG. 1 are given similar reference numerals. The internal spacer 126 is positioned vertically with respect to gravity. The internal spacer 126 provides the minimum separation distance B between the face 23 of the sensor 22 and a maximum fluid level 128 of the fluid within the internal spacer 126, which is lower than the maximum fluid level 28 of the tank 16, by trapping an air/vapor bubble 121 inside the spacer 126 to push the maximum fluid level 128 inside the spacer 126 away from the face of the sensor 23, much like submerging a cup upside down in water. The internal spacer 126 is a tubular structure having a wall extending axially and having first and second open free ends 126a, 126b, respectively. The face 23 of the sensor 22 is positioned adjacent the first free end 126a and the second free end 126b is in communication with the interior of the tank 18.

The height C of the internal spacer 126 is at least equal to the minimum required spacer height shown in FIG. 2, as discussed above, and is preferably greater than the minimum required spacer height to account for possible tilting of the tank 18 or sloshing of the fluid within the internal spacer 126. If the tank 18 and internal spacer 126 are tilted or if sloshing occurs, the air/vapor bubble 121 may escape from the internal spacer 126, raising the level 128 closer to the level 28. Therefore, the actual height C of the internal spacer 126 is preferably greater than the minimum required spacer height C. For example, if the ring time of the transducer is 350 microseconds, the minimum spacer height C is approximately 2.4 inches, as plotted in FIG. 2. The actual height of the internal spacer may be chosen to be 3.5 or 4 inches to reduce the chance of air/vapor escaping. Thus, similar to the construction described in FIG. 1, the minimum separation distance B is equal to or greater than half the near field distance. In some constructions, the internal spacer 126 may include a flange for inhibiting the air/vapor bubble 121 from escaping.

In operation, the fluid level sensor 22 is powered by the same power source that provides power to the temperature control system 14. In the construction of FIG. 4, a generator set 91 provides power to the fluid level sensor 22 and the temperature control system 14. In the construction of FIG. 3, a battery provides power to the fluid level sensor 22 and the engine starter 94, which starts the engine 92 to drive the compressor 66 of the temperature control system 14. In other constructions, other types of suitable power sources may be employed.

The output power, oscillator frequency, and analog circuitry of the fluid level sensor 22 depend on a constant input voltage. During startup of the compressor 66 of the temperature control system 14, which occurs as needed while the trailer 38 or container 90 is in transit, the power source 98, 91 is subjected to a heavy load, e.g., cranking, causing the voltage supply to the fluid level sensor 22 to droop and be unstable (e.g., power supply noise).

While the trailer 28 or container 90 is in transit, vibrations from movement over the road or rail, or other turbulence, causes vibrations in the surface 30 of the fluid 20. The combination of power supply noise and vibration noise in the fluid surface 30, simultaneously, may result in a nondeterministic signal. A nondeterministic signal introduced to the fluid level algorithm results in multiple possible fluid levels being computed, causing glitches in the fluid level measurement, such as rapid changes in the fluid level reading in a short period of time, e.g., more than 4% in less than 10 seconds, when the algorithm selects the wrong fluid level out of the possible fluid levels.

When the sensor 22 is spaced from the surface 30 of the fluid 20 by at least half the near field distance, the nondeterministic signal is inhibited and glitches are avoided. Thus, the fluid level measurement system 10, 110 is configured such that the sensor 22 is spaced from the maximum fluid level 28, 128 of the tank 18 by at least half the near field distance such that the sensor 22 is spaced from the fluid surface 30 by a distance greater than half the near field distance when the tank 18 is not full. The spacer 26, 126 is sized accordingly to provide the necessary minimum separation distance B.

Thus, the invention provides, among other things, a fluid level sensor spaced from a maximum fluid level of the tank by a distance greater than or equal to half the near field distance of the sensor.

What is claimed is:

1. A transport refrigeration system for a transportable temperature controlled space, the transport refrigeration system comprising:
   a compressor, a condenser and an evaporator fluidly connected to one another;
   an engine operatively connected to the compressor; and
   a fuel tank assembly fluidly connected to the engine, wherein the fuel tank assembly is subjected to vibrations from movement of the temperature controlled space as the temperature controlled space is transported, the fuel tank assembly including:

a fuel tank configured to contain a fuel, a fuel vapor and air, the fuel tank having a maximum fuel level;

an ultrasonic fluid level sensor configured to be directed toward a surface of the fuel such that sound from the fluid level sensor is reflected from the surface of the fuel for sensing a level of fuel, the fluid level sensor coupled to the fuel tank and positioned a distance from the maximum fuel level; and a power source electrically connected to the fluid level sensor for powering the fluid level sensor;

wherein the fluid level sensor includes a transducer having a ring period and wherein the distance from the fluid level sensor to the maximum fuel level is at least half the distance that the sound travels through the fuel vapor and air toward the surface of the fuel during the ring period of the transducer.

2. The transport refrigeration system of claim 1, wherein the power source is electrically connected to the transport refrigeration system such that the fuel level sensor is subjected to electrical noise from startup of the transport refrigeration system.

3. The transport refrigeration system of claim 1, further comprising a spacer positioned adjacent the fluid level sensor for providing a dry space between the fluid level sensor and the maximum fuel level, wherein the dry space has a length of at least half the distance that the sound travels through the fuel vapor during the ring period of the transducer.

4. The transport refrigeration system of claim 3, wherein the fluid level sensor abuts the spacer.

5. The transport refrigeration system of claim 3, wherein the spacer extends from an outer surface of the fuel tank.

6. The transport refrigeration system of claim 3, wherein the spacer is positioned substantially within an interior of the tank, wherein the spacer provides the dry space by trapping fuel vapor and air inside the spacer.

7. The transport refrigeration system of claim 1, wherein the fluid level sensor is distanced from the maximum fuel level by at least half a nearfield distance, wherein the near field distance is calculated using the equation $D_{nf} = V_{sd} * T_t$, where $D_{nf}$ is the near field distance, $V_{sd}$ is the speed of sound through the fuel vapor and air, and $T_t$ is the ring period of the transducer.

8. The transport refrigeration system of claim 1, wherein the distance from the fluid level sensor to the maximum fuel level is about half the distance that sound travels through the fuel vapor and air toward the surface of the fuel during the ring period of the transducer.

9. The transport refrigeration system of claim 1, wherein the fluid level sensor is configured to be distanced above the surface of the fuel when the fuel is at the maximum fuel level such that the fluid level sensor is disposed outside the fuel.

10. A transport refrigeration system for a transportable temperature controlled space, the transport refrigeration system comprising:

a compressor, a condenser and an evaporator fluidly connected to one another;

an engine operatively connected to the compressor; and a fuel tank assembly fluidly connected to the engine, wherein the fuel tank assembly is subjected to vibrations from movement of the temperature controlled space as the temperature controlled space is transported, the fuel tank assembly including:

a fuel tank configured to contain a fuel, a fuel vapor and air, the fuel tank having a maximum fuel level and an interior and an exterior;

an ultrasonic fluid level sensor configured to be directed toward a surface of the fuel such that sound from the fluid level sensor is reflected from the surface of the fuel for sensing a level of fuel, the fluid level sensor coupled to the fuel tank and spaced from the maximum fuel level; and a tubular spacer having a first end and a second end and a length between the first end and the second end, wherein the first end is positioned adjacent the ultrasonic fluid level sensor and the second end is positioned in communication with the interior of the tank;

wherein the fluid level sensor includes a transducer having a ring period and wherein the length of the spacer is at least half the distance that the sound travels through the fuel vapor and air toward the surface of the fuel during the ring period of the transducer.

11. The transport refrigeration system of claim 10, wherein the spacer extends from an outer surface of the fuel tank.

12. The transport refrigeration system of claim 10, wherein the spacer is positioned substantially within an interior of the tank, wherein the spacer provides the dry space by trapping a gas inside the spacer.

13. The transport refrigeration system of claim 10, wherein the length of the spacer is at least half a nearfield distance, wherein the near field distance is calculated using the equation $D_{nf} = V_{sd} * T_t$, where $D_{nf}$ is the near field distance, $V_{sd}$ is the speed of sound through the fuel vapor and air, and $T_t$ is the ring period of the transducer.

14. The transport refrigeration system of claim 10, wherein the length of the space is about half the distance that the sound travels through the fuel vapor and air toward the surface of the fuel during the ring period of the transducer.

15. The transport refrigeration system of claim 10, wherein the fluid level sensor is configured to be distanced above the surface of the fuel when the fuel is at the maximum fuel level such that the fluid level sensor is disposed outside the fuel.

* * * * *